United States Patent [19]
Ueda et al.

[11] Patent Number: 5,610,344
[45] Date of Patent: Mar. 11, 1997

[54] ENVIRONMENTAL TEST APPARATUS

[75] Inventors: Ichiro Ueda; Masanori Ishizuka, both of Yokohama, Japan

[73] Assignee: Nippon Yusen Kaisha, Tokyo, Japan

[21] Appl. No.: 583,529

[22] Filed: Jan. 5, 1996

Related U.S. Application Data

[63] Continuation of Ser. No. 113,680, Aug. 31, 1993, abandoned.

[30]    Foreign Application Priority Data

Sep. 9, 1992  [JP]  Japan .................... 4-266721

[51] Int. Cl.⁶ .................................................. G01N 17/00
[52] U.S. Cl. .............................. 73/865.6; 374/57; 73/663
[58] Field of Search .......................... 73/865.6, 431, 73/663, 662; 374/45, 57

[56]                  References Cited

U.S. PATENT DOCUMENTS

| | | | |
|---|---|---|---|
| 4,602,503 | 7/1986 | Hile et al. | 73/865.6 |
| 4,729,246 | 3/1988 | Meigaard et al. | 73/865.6 |
| 4,812,750 | 3/1989 | Keel et al. | 73/865.6 |
| 4,817,447 | 4/1989 | Kashima et al. | 73/865.6 |
| 4,925,089 | 5/1990 | Chaparro et al. | 73/865.6 |
| 4,995,273 | 2/1991 | Kisima et al. | 73/865.6 |
| 5,039,228 | 8/1991 | Chalmers | 73/865.6 |
| 5,285,672 | 2/1994 | Yao | 73/865.6 |
| 5,412,991 | 5/1995 | Hobbs | 73/663 |
| 5,513,538 | 5/1996 | Baker et al. | 73/663 |

*Primary Examiner*—Hezron E. Williams
*Assistant Examiner*—Helen C. Kwok
*Attorney, Agent, or Firm*—Longacre & White

[57]                  ABSTRACT

An environmental test apparatus comprising a substrate on which a test specimen is mounted securely, a cover disposed on the substrate for housing the test specimen within a tightly closed space thereof, a temperature/moisture adjusting system for adjusting temperature and moisture in the tightly closed space, a memory for storing control data such as accumulated past data or various kinds of environment reproducing data, a control system for controlling the temperature/moisture adjusting system based on the control data stored in the memory and a data measuring system for measuring and recording various kind of data for environmental test. Since the test specimen is disposed in the tightly closed space and temperature and moisture in the space are controlled based on the control data such as the past accumulated data or various kinds of environment reproducing data, test, for example, on transportation, storage or accumulation can be conducted with no actual experience of such an environment but under simulated environmental conditions relevant thereto, so that the effects of the environmental conditions on the cargos can be specified scientifically and accurately.

11 Claims, 4 Drawing Sheets

ENVIRONMENTAL TEST APPARATUS

This is a continuation of application Ser. No. 08/113,680, filed Aug. 31, 1993, which was abandoned upon the filing hereof.

BACKGROUND OF THE INVENTION

1. Field of the Invention

The present invention concerns an environmental test apparatus for investigating the cause of damages exerted on cargos in the course of their distribution, as well as for research and development of countermeasures for preventing such damages. In particular, the invention relates to an environmental test apparatus capable of conducting an environmental test regarding, for example, transportation, storage or accumulation of cargos with no actual experience of such an environment but under simulated environmental conditions relevant thereto.

2. Description of the Prior Art

Heretofore, tests for cargo packages, marine equipments, transportation vessels and similar other matters have been conducted in accordance with predetermined standards on every individual environmental factors. They have been demonstrated by, for example, falling test, impact test, vibration test, heat resistance test and temperature resistance test.

For instance, in a case of transportation, although design criteria have been determined mainly on empirical rules according to each of the methods regarding railway transportation, marine transportation, overland transportation and air transportation, they are not related to each other. Accordingly, except for marine containers for which international standards are specified all the specifications for the package and packing of cargos, transportation vessels (such as containers) and transportation components (such as pallets) are determined at present based on the experience and at the risk of individual consignors who select and utilize transportation organs.

However, in the field of international transportation, combined and sequential way of transportation has become customary, and cargos are transported by utilizing a combination of several transportation organs including railways, load vehicles, marine vessels and aircrafts. Further, at a transit site between each of such transportation organs, cargos are generally put to temporal storage and accumulation.

Accordingly, it is necessary to test and demonstrate the effects of various environments exerted on the cargos by simulating actual environments with respect to their type and extent, thereby rationalizing the package or packing and attain resource-saving for package, packing, as well as for components for use in loading/unloading operation. However, no test apparatus capable of satisfying such a purpose are not present.

Further, although proposals have been made for new materials, new fabrication methods and new systems regarding the package, packing and loading/unloading component per se, the effects obtained by utilizing them can not but be estimated from the result of use in actual transportation and there is no effective means for previously evaluating the effects collectively on various environmental factors included in the combined and sequential transportation.

Referring to composite distribution, when a great quantity of cargos are actually transported and if abnormality or damage is found upon checking after arrival at a destination, a consignee informs a consignor, for example, the extent and kind of the damage. The consignor then investigates the content of the claim, improves the package and packing based on the empirical rule, and recovers the damages to cargos by his cargo insurance. An underwriter demands a carrying agency to pay a portion of the damage for which the agency is responsible and, finally, the carrying agency recovers the damage by his carrier-responsible insurance.

In the above-mentioned conventional method, since the countermeasure is taken after occurrence of the abnormality and damage, it is not possible to prevent, before hand, the occurrence of cargo abnormality and damage per se. In addition, since the loss ratio of the cargo insurance and the carrier insurance is worsened, there is a problem that the insurance rate is increased. Further, even if the consignor improves the package and packing based on the empirical rule, there is no reasonable assurance that other cargos damage does not occur again. Then, if the cargo damage should occur, countermeasures have to be taken over and over.

By the way, since cargos suffer from damages, with no exception, by environments that they encounter, scientific and accurate recognition is necessary for the effects of environmental conditions on the cargos in order to avoid such a vicious circle. This recognition enables to take necessary and sufficient countermeasures for preventing damages, as well as to determine package, packing, transportation container or the like suitable to the characteristics and the physical properties of the cargos. Further, it is also expected that this can save excessive use of damping materials, damping structures and packages, thereby improving the transportation and storage efficiency.

OBJECT OF THE INVENTION

The present invention has been achieved in view of the foregoing situations and it is an object thereof to provide an environmental test apparatus capable of simulating environments that cargos encounter and scientifically and accurately determining the effects of environmental conditions on the cargos, by using a cargo lot of an actual size (one unit) as a test specimen and capable of taking necessary and sufficient countermeasures for preventing damages.

Another object of the present invention is to provide an environmental test apparatus capable of also recognizing the effect of vibrations, for example, on package, packing, transportation container or damping material.

A further object of the present invention is to provide an environmental test apparatus capable of recognizing also a relationship between vibrations, and temperature and humidity.

A further object of the present invention is to provide an environmental test apparatus capable of exactly reproducing environmental conditions, particularly, upon marine transportation.

A further object of the present invention is to provide an environmental test apparatus capable of easy entry and delivery of a test specimen into and out of a tightly closed space and capable of providing the tightly closed space at a reduced cost.

A further object of the present invention is to provide an environmental test apparatus capable of conducting a test on cargos in a transportation vessel such as a container, as well as a test for heat insulating performance, gas tightness or like other property of the transportation vessel.

A still further object of the present invention is to provide an environmental test apparatus capable of recognizing effects of atmosphere on perishable foodstuffs.

SUMMARY OF THE INVENTION

The foregoing objects can be attained by an environmental test apparatus according to the present invention comprising:

a substrate on which a test specimen is placed and secured by a securing means;

a cover disposed on the substrate and having a tightly closed space at the inside thereof for housing the test specimen;

a temperature/moisture adjusting means for adjusting the temperature and the moisture in the tightly closed space;

a memory means for storing control data such as accumulated data in the past and various types of environment reproducing data;

a control means for controlling the temperature/moisture adjusting means based on the control data stored in the memory means and a data measuring means for measuring and recording various kinds of data for the environmental test.

In the present invention, the test specimen is disposed in the tightly closed space and the temperature and the moisture in the lightly closed space are controlled based on the control data such as accumulated data in the past and various kinds of environment reproducing data. Accordingly, a test regarding, for example, transportation storage or accumulation can be conducted, with no actual experience of such an environment but under simulated environmental conditions relevant thereto and it is possible to scientifically and accurately specify the effects of the environmental conditions on the cargos.

BRIEF DESCRIPTION OF THE ACCOMPANYING DRAWINGS

The foregoing, as well as other objects and advantages of the present invention will be recognized easily by reading the following descriptions with reference to the appended drawings, wherein FIG. 1 is an entire view for the constitution illustrating an environmental test apparatus of a preferred embodiment according to the present invention;

DESCRIPTION OF PREFERRED EMBODIMENTS

Descriptions will now be made at first referring to FIG. 1.

Figure 1:
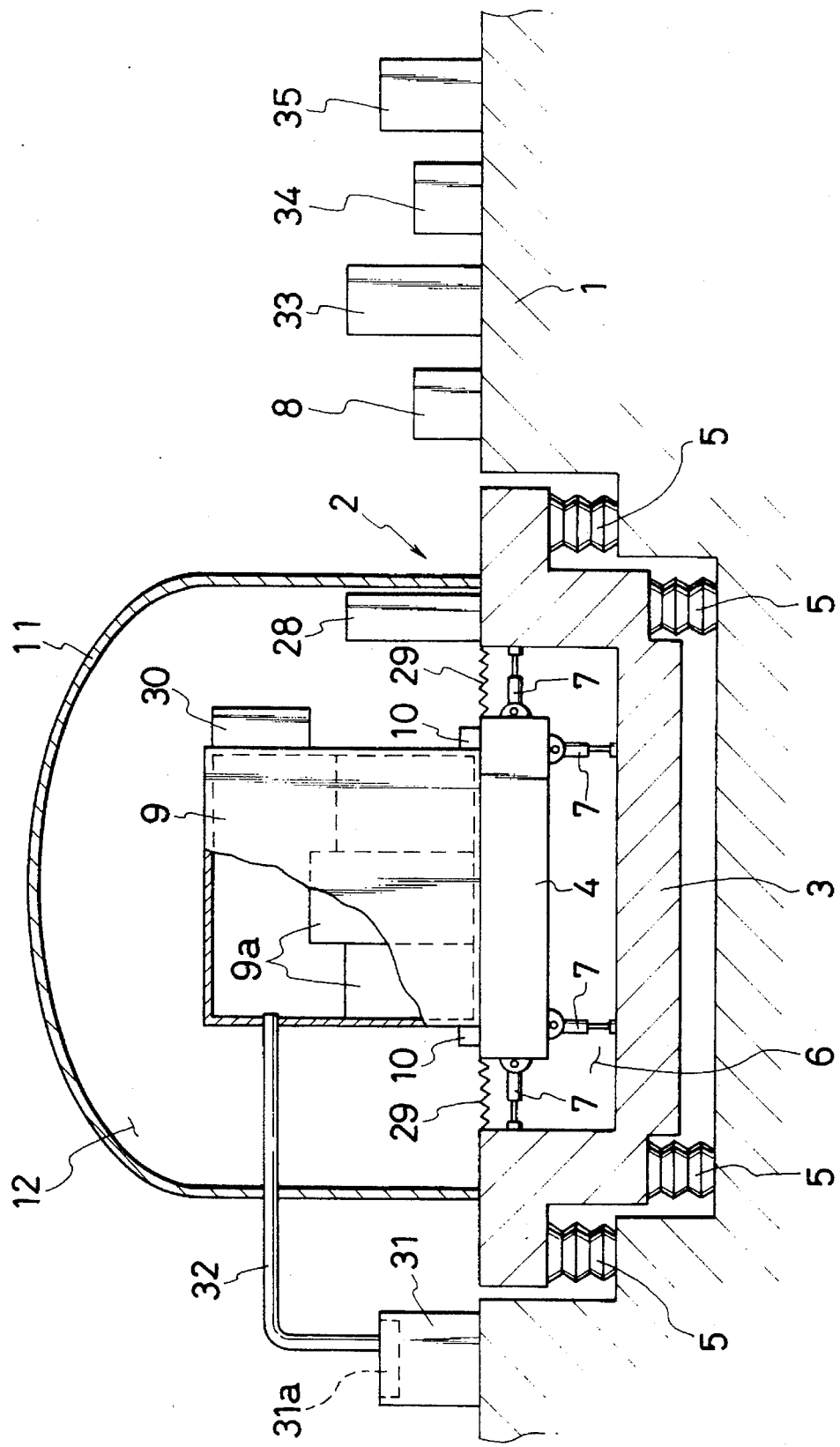

FIG. 1 shows a preferred embodiment of an environmental test apparatus according to the present invention, in which reference numeral 1 denotes a main foundation in a test building, on which a substrate 2 comprising a floating foundation 3 and a vibrational stand 4 is disposed.

As shown in FIG. 1, the floating foundation 3 is supported on the main foundation 1 by way of a damping mechanism 5 such as pneumatic springs, so that vibrations generated in the vibrational stand 4 to be described later can be prevented from propagating to the main foundation 1.

As shown in FIG. 1, a recess 6 larger than the vibrational stand 4 is formed in the central portion of the floating foundation 3. The vibrational stand 4 is disposed in the recess 6 with the upper surface thereof being substantially in flush with the upper surface of the floating foundation 3, so that vibrations are applied by a vibration mechanism 7 disposed in the recess 6.

Figure 2:
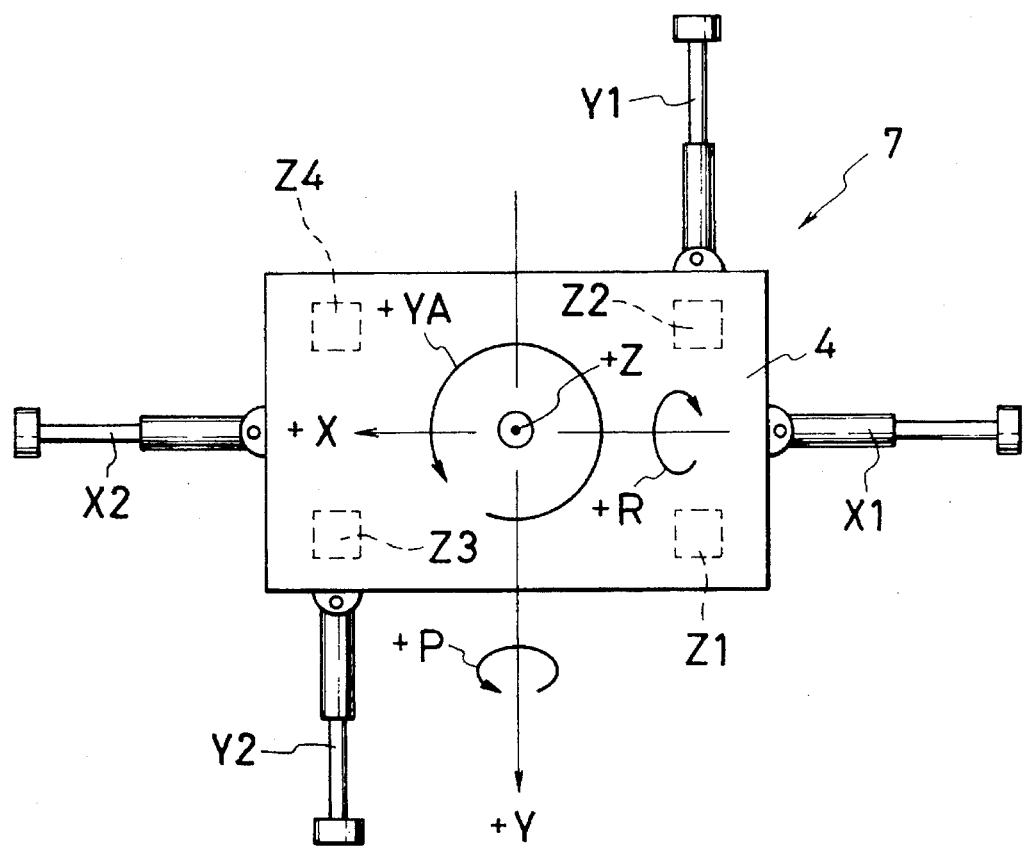
FIG. 2 is an explanatory view illustrating the constitution of a vibration mechanism for vibrating a vibrational stand.

As shown in FIG. 2, the vibration mechanism 7 comprises two sets of longitudinal actuators X1, X2, two sets of lateral actuators Y1, Y2 and four sets of vertical actuators Z1, Z2, Z3 and Z4, which are driven by a control oil from a hydraulic driving device 8 shown in FIG. 1. With this constitution, vibrations having a degree of freedom for six-axes including longitudinal direction X, lateral direction Y, vertical direction Z, rolling direction R, pitching direction P and yawing direction YA can be given by a lesser number of actuators.

The vibration mechanism 7 is so designed as simulating environments in marine transportation and adapted such that it can optionally generate about ±20 degree of rolling in a low frequency region of about 0 to 0.05 Hz, as well as apply vibrations in a high frequency region up to 100 Hz, during their rolling movement, at a vibrational strength of 2G for each of the lateral direction Y and the longitudinal direction X and 3G for the vertical direction Z simultaneously, in the form of separate and individual waveforms. For the control of the vibrations, the hydraulic driving device 8 is driven such that predetermined waveforms can be reproduced exactly in accordance with the center of gravity of the test specimen 9 which is placed and secured on the vibrational stand 4.

As shown in FIG. 1, a marine container having cargos 9a loaded to the inside is disposed as the test specimen 9 and it is secured by a securing means 10. The test specimen 9 is disposed in a tightly closed space 12 at the inside of a cover 11 disposed on the floating foundation 3.

Figure 3:
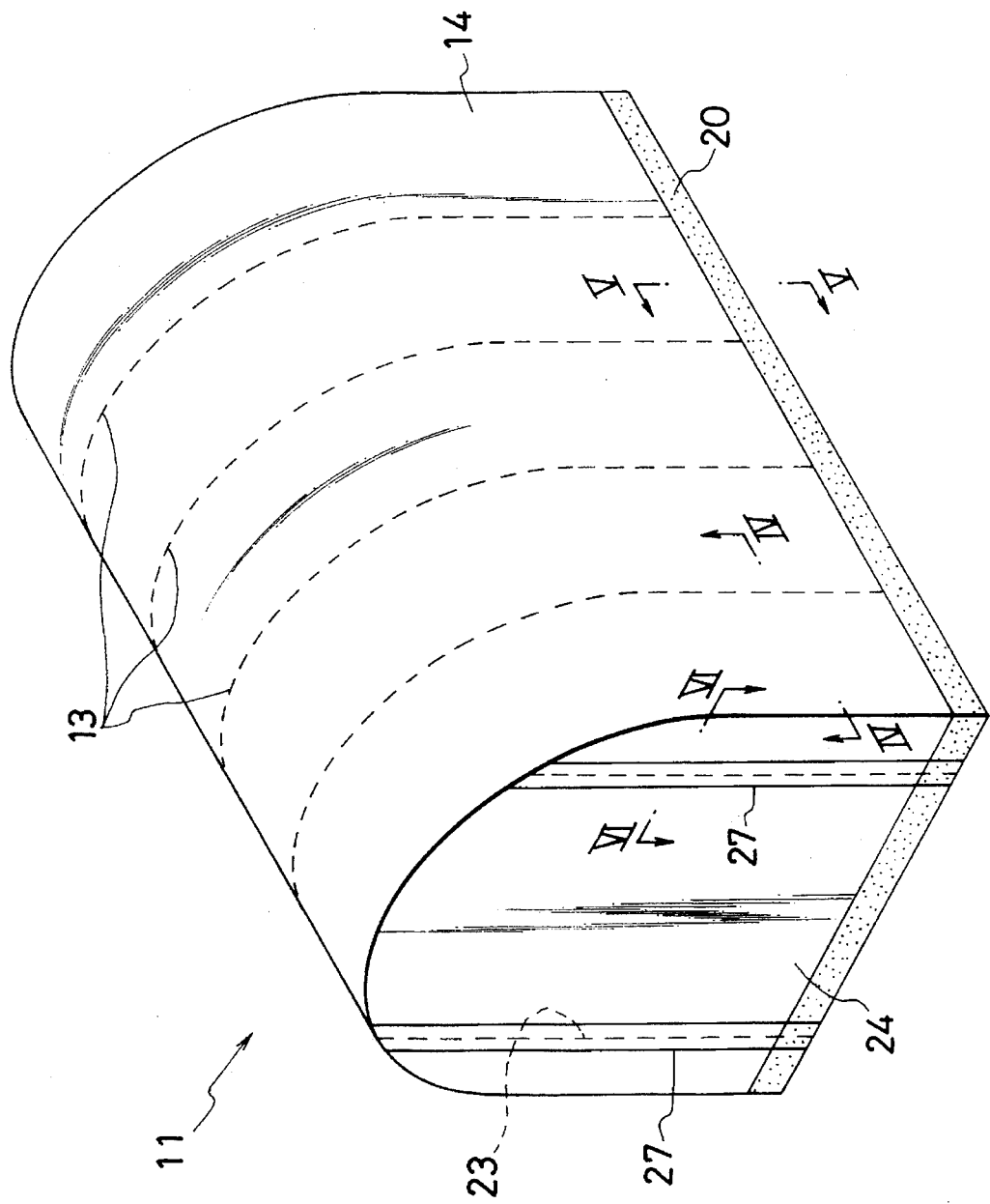
FIG. 3 is a perspective view illustrating the constitution of a cover.
Figure 4:
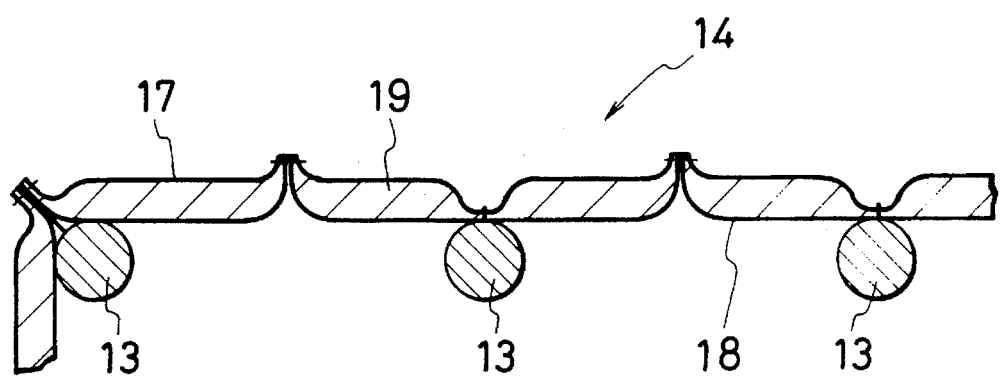
FIG. 4 is an enlarged cross sectional view taken along a line IV—IV in FIG. 3.

As shown in FIGS. 3 and 4, the cover 11 is of a movable and extensible type comprising skeletons 13 and a membrane material 14 and has a structure capable of opening/closing. Guide rollers 16 rolling along rails 15 laid on the floating foundation 3 are disposed to the lower end for each of the skeletons 13 as shown in FIG. 5.

Figure 5:
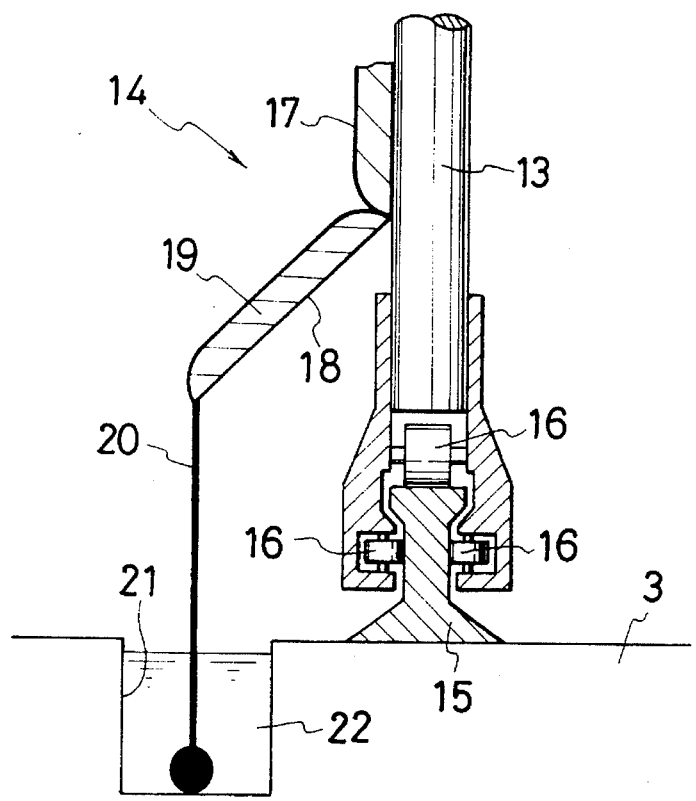
FIG. 5 is an enlarged cross sectional view taken along a line V—V in FIG. 3.

The membrane material 14 comprises, as shown in FIGS. 4 and 5, an outer material 17 formed by laminating a synthetic resin sheet on glass fibers, an inner material 18 formed by applying a silicone coating on glass fibers and a heat insulating material 19 made of urethane foams disposed between both of the materials 17 and 18. A skirt 20 is disposed to the circumferential edge at the lower end of the membrane material 14, as shown in FIGS. 3 and 5. The lower edge of the skirt 20 is inserted into a sealing groove 21 filled with an anti-freezing liquid 22 at the inside thereof, so that an effective sealing can be provided though the cover 11 is made movable and extensible.

As shown in FIG. 3, an opening 23 is disposed at one longitudinal end of the cover 11 and the opening 23 is closed by a roll-up type door 24.

Figure 6:
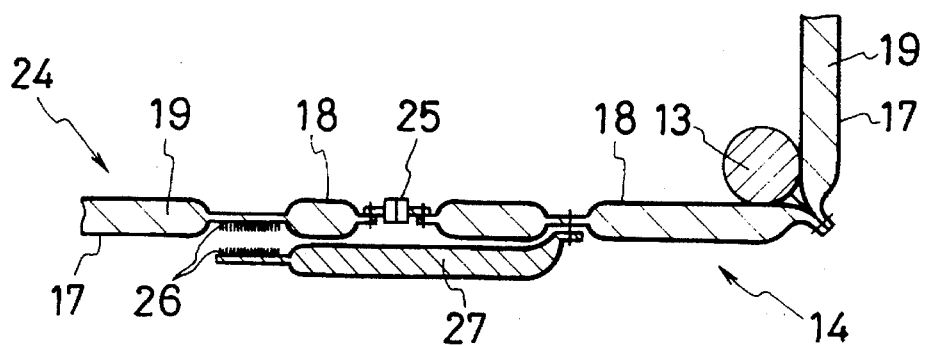
FIG. 6 is an enlarged cross sectional view taken along a line VI—VI in FIG. 3

Namely, as shown in FIG. 6, the door 24 has the same structure as that for the membrane material 14, and the both side edges thereof are connected with the membrane material 14 by way of a slide fastener 25. The outer surface of the slide fastener 25 is covered with a cover material 27 having one end secured to the membrane material 14 and the other end connected to the door 24 by way of a VELCRO-fastener 26.

As shown in FIG. 1, a temperature/moisture adjusting device 28 is disposed at the inside of the cover 11 on the floating foundation 3 for adjusting the temperature and the moisture in the tightly closed space 12. Sealing is provided by bellows 29 between the floating foundation 3 and the vibrational stand 4 for allowing the vibrations of the vibrational stand 4. The bellows 29 enable to protect the vibration mechanism 7 against damages caused by moisture.

Further, as shown in FIG. 1, an internal temperature/ moisture adjusting device 30 is disposed to the test specimen 9 for adjusting the temperature and the moisture at the inside of the marine container as the test specimen 9. Further, a gas composition adjusting device 31 is disposed on the main foundation 1 for adjusting the composition of gases at the inside of the test specimen 9.

As shown in FIG. 1, the gas composition adjusting device 31 is adapted to adjust the composition of gases necessary for the test and supply the thus adjusted gases by way of an air tight flexible hose 32 to the inside of the test specimen 9. Gases of maturation hormone, for example, ethylene and organic hydrocarbon gases generated from cargos 9a are adapted to be adsorbed selectively by gas filters 31a. Cartridges of adsorbents such as activated carbon are detachably mounted to the filters 31a. The gas composition adjusting device 31 is controlled, together with the hydraulic driving device 8, the temperature/moisture adjusting device 28 and the internal temperature/moisture adjusting device 30, by a control device 33 having an external memory device 34.

The external memory device 34 stores control data such as accumulated data in the past and various kinds of environment reproducing data which are classified depending on the type of the test specimen 9 and the purpose of the test. The control device 33 reads necessary control data from the external memory device 34, selects a necessary device from each of the devices 8, 28, 30 and 31 and controls the thus selected device in accordance with the control data. Then, as shown in FIG. 1, various kinds of data for the environmental test are measured and recorded by a data measuring device 35.

Descriptions will now be made to the operation of this embodiment.

When an environmental test is conducted on the test specimen 9, the door 24 of the cover 11 is at first rolled up and the cover 11 is contracted rightward in FIG. 3 to expose a portion above the vibrational stand 4.

Then, the test specimen 9 is placed on the vibrational stand 4 by using, for example, a crane (not illustrated) and the specimen 9 is secured by the securing means 10 to the vibrational stand 4. Subsequently, the cover 11 is extended to cover the test specimen 9 and the opening 23 is closed by the door 24 to define a tightly closed space 12.

Next, the internal temperature/moisture adjusting device 30 and the gas composition adjusting device 31 are connected with the inside of the test specimen 9. Then, the hydraulic driving device 8, the temperature/moisture adjusting device 28, the internal temperature/moisture adjusting device 30 and the gas composition adjusting device 31 are actuated and they are controlled in accordance with the control data read from the external memory device 34.

Thus, a test can be conducted, for example, on transportation, storage, accumulation or like other environment, with no actual experience of such an environment but under simulated environmental conditions and the effects of environmental conditions on the cargos can be specified scientifically and accurately. Since the hydraulic driving device 8, the temperature/moisture adjusting device 28, the internal temperature/moisture adjusting device 30 and the gas composition adjusting device 31 are provided, any kind of environmental tests can be carried out by properly selecting and using them.

Namely, when a test is conducted, for instance, on resistance to vibration, impact shock, jolting or temperature and moisture of container loaded cargos, special cargos, dangerous cargos, liquid cargos or vehicle cargos such as automobiles, this can be conducted by using the hydraulic driving device 8 and the temperature/moisture adjusting device 28.

Further, in a case of conducting a test on cold insulating or heat insulating performance and gas tightness of a container, this can be conducted by using the temperature/ moisture adjusting device 28, the internal temperature/moisture adjusting device 30 and the gas composition adjusting device 31.

Further, in a case of conducting an experiment for the development of new type containers, special containers, various kinds of transportation equipments and materials, or conducting test and research for putting perishable foodstuffs to an optimum transportation state, they can be done by using the hydraulic driving device 8, the temperature/ moisture adjusting device 28, the internal temperature/moisture adjusting device 30 and the gas composition adjusting device 31.

Further, an evaluation test for packaged cargos, a limit buckling test or limit distortion test for package and packing in accordance with JIS standards or an evaluation test for cargos loaded in various ways in accordance with modes of transportation routes can be done by using the hydraulic driving device 8, the temperature/moisture adjusting device 28 and the internal temperature/moisture adjusting device 30.

Further, a test for investigating the characteristics of loading/unloading operation and transportation equipments, a fluidizing test or dewatering experiment for water-containing granular materials can be conducted by using the hydraulic driving device 8, the temperature/moisture adjusting device 28, the internal temperature/moisture adjusting device 30 and the gas composition adjusting device 31.

Although descriptions have been made in the foregoing embodiment to a case in which the cover 11 is of a movable and extensible type and has a structure capable of opening/ closing, a cover of a stationary structure having an entry/ delivery portion for the test specimen 9 may also be used. In addition, the internal temperature/moisture adjusting device 30 and the gas composition adjusting device 31 may also be disposed at the inside of the cover 11 on the floating foundation 3 like that the temperature/moisture adjusting device 28.

Further, infrared lamps or like other means may be disposed to the cover 11 for illuminating the test specimen 9 so that a sunshiny state can be simulated, although this is not particularly described in the foregoing embodiment.

As has been described above, according to the present invention, since the test specimen is disposed in the tightly closed space and the temperature and the moisture in the tightly closed space are controlled based on the control data such as accumulated data in the past or various kinds of environment reproducing data, an environmental test regarding, for example, transportation, storage or accumulation can be conducted with no actual experience of such an environment but under simulated environmental conditions, so that the effects of the environmental conditions on the cargos (test specimen) can be specified scientifically and accurately. Therefore, a necessary and sufficient countermeasure for preventing damage can be taken, package, packing, transportation container or the like adaptable to the performance and the physical properties of the cargos can be determined, as well as excessive damping structure or the like can be saved to improve the efficiency for transportation and storage.

Further, according to the present invention, since the test specimen is placed and secured on the vibrational stand and can be applied with vibrations by the vibration mechanism, it is possible to accurately recognize the effects of the vibrations on the cargos, as well as the effects of the vibrations, for example, on package, packing, transportation container or damping material.

Further, since the vibration mechanism is controlled by the control means, vibrations identical with actual vibrations during transportation can be obtained easily and the relationship between the vibrations and temperature/moisture can also be recognized.

Further, since the vibration mechanism has a degree of freedom for six-axes, environmental conditions, in particular, regarding marine transportation can accurately be reproduced.

Further, since the cover is constituted as a movable and extensible type having a structure capable of opening/closing entry and delivery of the test specimen into and out of the tightly closed space can be facilitated and the tightly closed space can be provided at a reduced cost.

Further, since the internal temperature/moisture adjusting means is disposed for adjusting the temperature and the moisture at the inside of the test specimen and the internal temperature/moisture adjusting means is controlled by the control means, it is possible to conduct a test on the cargos in a transportation vessel such as a container, as well as a test, for example, on the heat insulating performance and the gas tightness of the container itself.

Further, since the gas composition adjusting means is disposed for adjusting the composition of gases in the test specimen and the gas composition adjusting means is controlled by the control means, the effects of atmosphere, for example, on perishable foodstuffs can also be recognized.

As many apparently widely different embodiments of this invention may be made without departing from the spirit and scope thereof, it is to be understood that the invention is not limited to the specific embodiments thereof except as defined in the appended claims.

What is claimed is:

1. An environmental test apparatus a substrate on which a test specimen is placed;

means for securing the test specimen on the substrate;

a cover disposed on the substrate and having a tightly closed space at the inside thereof for housing the test specimen, wherein the cover includes a series of frames spaced apart from each other, a flexible membrane material covering and connecting each of the frames, and a skirt disposed to the circumferential edge at the lower end of the membrane material, said cover defining a closed specimen-housing space above the substrate, the cover being movable and extensible with respect to said substrate;

the lower end of the skirt being inserted into a sealing groove disposed adjacent to the substrate and filled with a liquid, a temperature/moisture adjusting means for adjusting the temperature and moisture in said tightly closed space;

a memory means for storing real-life control data sets including a plurality of sets of actual environmental conditions which are recorded simultaneous with an occurrence of said actual environmental conditions;

a control means for controlling said temperature/moisture adjusting means by selecting one of the real life control data sets stored in said memory means; and data measuring means for measuring and recording various kinds of data from an environmental test;

wherein the substrate comprises a floating foundation supported on a main foundation by way of a damping mechanism and a vibrational stand attached to said floating foundation by way of a vibration mechanism and applied with vibrations from the vibration mechanism, and the test specimen is placed and secured on said vibrational stand;

said vibration mechanism being controlled by the control means.

2. The test apparatus recited in claim 1, wherein an internal temperature/moisture adjusting means is disposed for adjusting the temperature and the moisture at the inside of the test specimen and said internal temperature/moisture adjusting means is controlled by the control means.

3. The test apparatus defined in claim 1, wherein a gas composition adjusting means is disposed for adjusting the composition of gases at the inside of the test specimen and said gas composition adjusting means is controlled by the control means.

4. The test apparatus as defined in claim 1, wherein each of said frames comprises a guide roller provided at an end thereof, said guide roller rolling along a rails provided on the substrate to thereby adjust the position of said cover.

5. The test apparatus as defined in claim 1, wherein the membrane material comprises a heat insulating material.

6. The test apparatus as defined in claim 1, said vibration mechanism has a degree of freedom for six axes including vertical direction, lateral direction, forward-to-backward direction, rolling direction, pitching direction and yawing direction.

7. The test apparatus as defined in claim 1, wherein the vibration mechanism comprises four sets of horizontal actuators disposed on the peripheral four sides of a vibrational stand in a flat rectangular shape, respectively, and four sets of actuators disposed on the lower surface of the vibrational stand.

8. An environmental test apparatus comprising:

a substrate on which a test specimen is placed;

means for securing the test specimen on the substrate;

a cover disposed on the substrate and having a tightly closed space at the inside thereof for housing the test specimen;

a temperature/moisture adjusting means for adjusting the temperature and moisture in said tightly closed space;

a memory means for storing real-life control data sets including a plurality of sets of actual environmental conditions which are recorded simultaneous with an occurrence of said actual environmental conditions;

a control means for controlling said temperature/moisture adjusting means by selecting one of the real life control data sets stored in said memory means; and data measuring means for measuring and recording various kinds of data from an environmental test;

wherein the substrate comprises a floating foundation supported on a main foundation by way of a damping mechanism and a vibrational stand attached to said floating foundation by way of a vibration mechanism and applied with vibrations from the vibration mechanism, and the test specimen is placed and secured on said vibrational stand;

said vibration mechanism has a degree of freedom for six axes including vertical direction, lateral direction, forward-to-backward direction, rolling direction, pitching direction and yawing direction;

said vibration mechanism being controlled by the control means.

9. The test apparatus defined in claim 8, wherein the cover includes a series of frames spaced apart from each other and a flexible membrane material covering and connecting each of the frames, said cover defining a closed specimen-housing space above the substrate, the cover being movable and extensible with respect to said substrate.

10. The test apparatus recited in claim 8, wherein an internal temperature/moisture adjusting means is disposed for adjusting the temperature and the moisture at the inside of the test specimen and said internal temperature/moisture adjusting means is controlled by the control means.

11. The test apparatus defined in claim 8, wherein a gas composition adjusting means is disposed for adjusting the composition of gases at the inside of the test specimen and said gas composition adjusting means is controlled by the control means.

* * * * *